Sept. 2, 1958  J. G. HAWLEY  2,850,120
COMPOUND PRESSURE BRAKE WITH AUTOMATIC CONTROL
Filed May 4, 1956  2 Sheets-Sheet 1
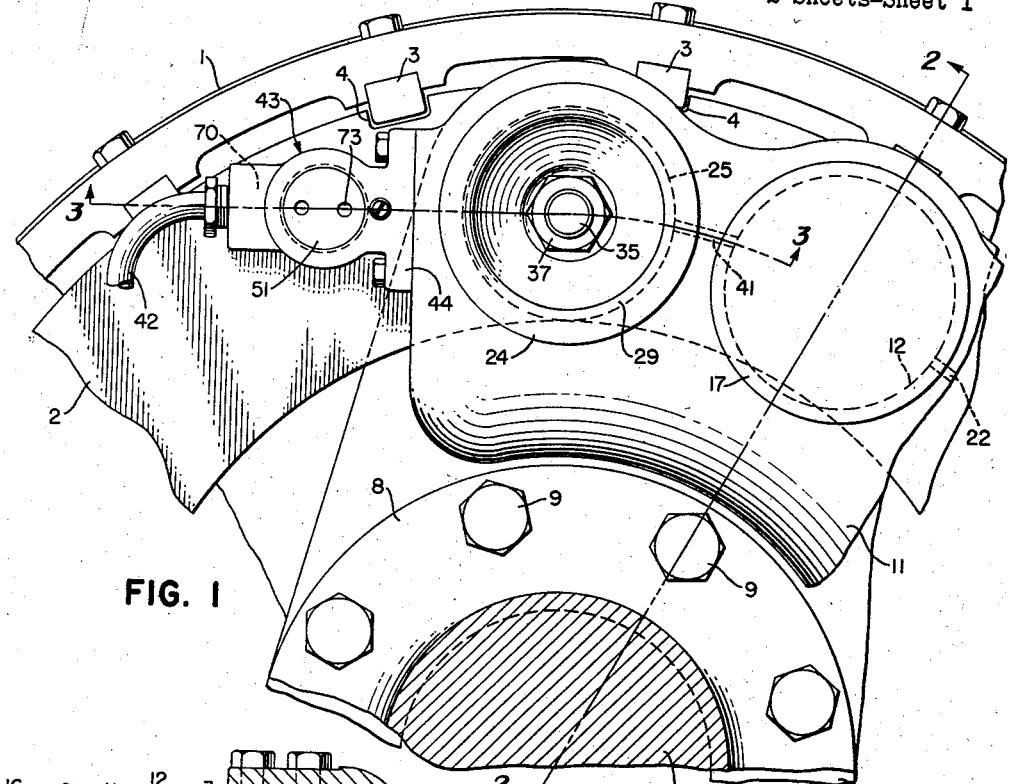
FIG. 1
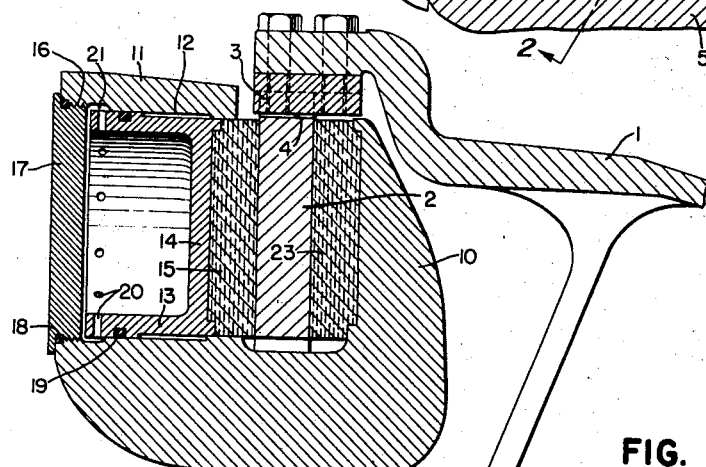
FIG. 2
*INVENTOR.*
JESSE G. HAWLEY
BY
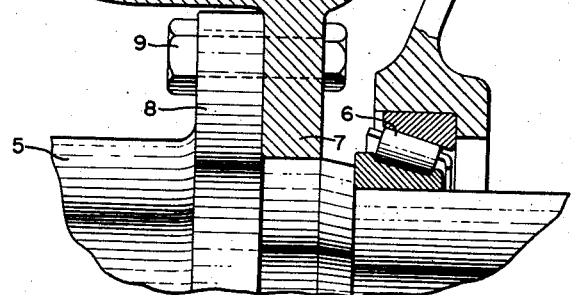
ATTORNEY Sept. 2, 1958 J. G. HAWLEY 2,850,120
COMPOUND PRESSURE BRAKE WITH AUTOMATIC CONTROL
Filed May 4, 1956 2 Sheets-Sheet 2

INVENTOR.
JESSE G. HAWLEY
BY
ATTORNEY

United States Patent Office 2,850,120
Patented Sept. 2, 1958

2,850,120

COMPOUND PRESSURE BRAKE WITH AUTOMATIC CONTROL

Jesse G. Hawley, Penn Yan, N. Y., assignor to The Goodyear Tire & Rubber Company, Akron, Ohio, a corporation of Ohio Application May 4, 1956, Serial No. 582,734

3 Claims. (Cl. 188—151)

This invention relates to brake operating mechanism and is especially useful in the control of brake shoes for cooperating with a rotatable brake disc.

In brakes used on aircraft, it is usual to provide a rotatable wheel with a disc carried thereby and to provide a support on a non-rotatable axle for providing brake shoe operating cylinders whereby brake shoes may be advanced into frictional engagement with the disc. With such apparatus, it has been proposed to provide automatic brake clearance mechanism but such mechanism has not been entirely satisfactory in that the shoes were not always withdrawn sufficiently due to recovery after distortion of the operating cylinder supports and warping of the discs due to unequal heating.

The present invention has for an object to provide hydraulically operated brake shoe mechanism in which clearance adjustment of the shoes may be accomplished hydraulically.

Another object of the invention is to provide for clearance take up of the brake hydraulically by use of a minimum quantity of hydraulic fluid.

A still further object is to accomplish clearance take up with liquid under low pressure and to accomplish brake application at a higher pressure. A further object is to provide mechanism for sealing off the low pressure fluid supply after clearance take up has been accomplished and maintaining the fluid used for such adjustment in sealed off condition while a higher pressure fluid is employed to apply braking pressure.

These and other objects will appear from the following description and the accompanying drawings.

Of the drawings:

Fig. 1 is a face view of the wheel and brake, the axle being shown in section.

Fig. 2 is a sectional view of the brake and wheel taken on line 2—2 of Fig. 1.

Figure 3:
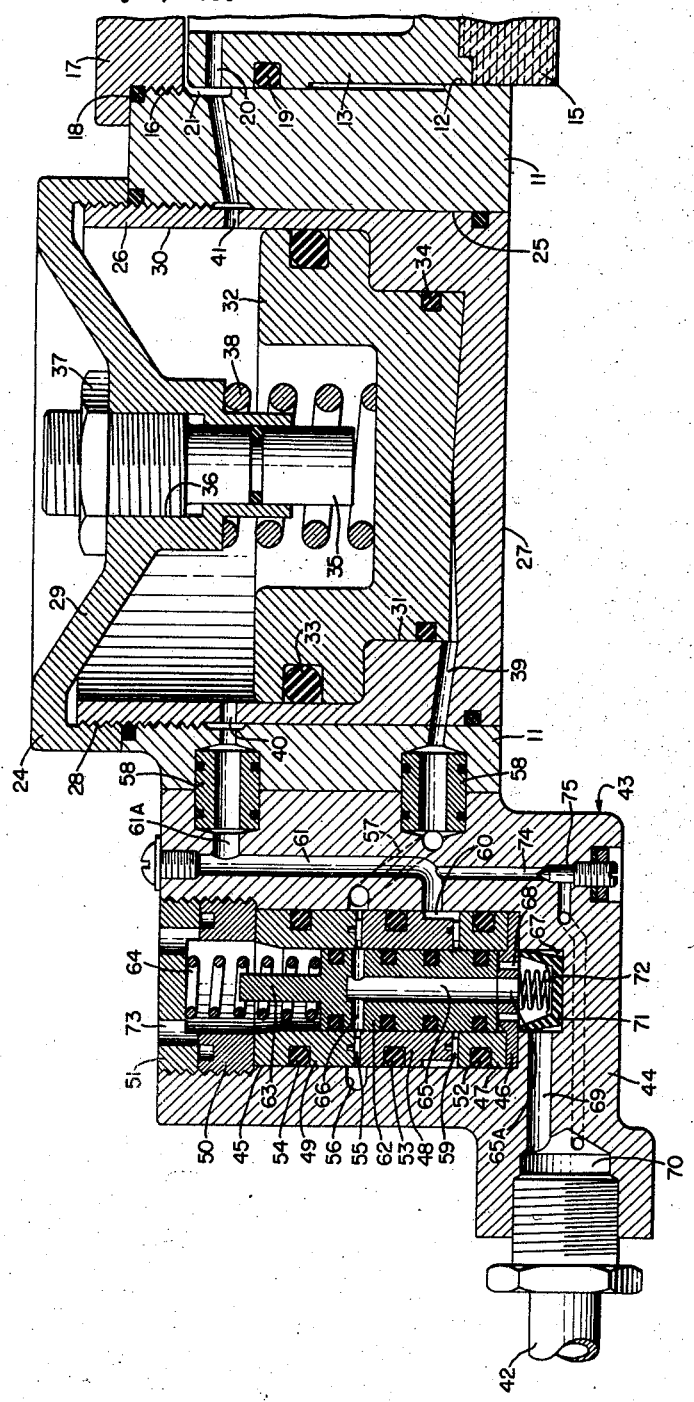
Fig. 3 is a sectional view taken on line 3—3 of Fig. 1.

Referring to the drawings, the numeral 1 designates a rotatable wheel which carries a brake disc 2 suspended therefrom by keys 3 fixed to the wheel and engaging in slots 4 in the outer periphery of the disc. The arrangement is such that the disc has free axial motion relative to the wheel. The wheel is rotatably supported from a nonrotatable axle 5 as by roller bearings 6.

A support 7 for the non-rotatable brake members is secured to a flange 8 of the shaft 5 as by bolts 9. The support 7 spans a substantial arcuate extent of the brake disc and is peripherally bifurcated to provide a brake shoe member 10 at the face of the disc nearer the wheel and a member 11 opposed to the opposite face of the disc. Arcuately spaced about the member 11 are a plurality of bores having their axes substantially parallel to that of the wheel and the bores extending entirely through the member 11.

Mounted in each of the bores 12 are pistons 13 each having a closed head 14 to which is secured a brake lining 15 of molded asbestos composition or other friction material. The rear end of the bores 12 are threaded as at 16 to receive a threaded cylinder head 17 sealed to the member 11 by a ring gasket 18. A sealing ring 19 is sealed in a groove about the skirt of the piston to seal it to the bore. The skirt of the piston is drilled radially at intervals, as at 20 so that the interior of the piston communicates with a groove 21 in the bore 12 at the extreme return stroke of the piston.

All of the bores 12 having pistons 13 are connected to operate in unison by passage 22 connecting their grooves 21 to one another.

While no means for returning the piston after a braking operation has been shown, it is intended that some means such as coil springs or auxiliary air cylinders will be employed for accomplishing such returns.

The invention contemplates that, in operation, when brake pressure is to be applied, pistons 13 will be moved forward in unison against the disc 2 and the disc will in turn be moved into frictional engagement with the brake lining 23.

The invention contemplates that in order to conserve use of hydraulic fluid, fluid under low pressure will be employed to take up brake clearance and then fluid under higher pressure will be used for braking purposes. To accomplish this, a transfer cylinder mechanism 24 is mounted in a bore 25, similar to the bores 12, of the member. The transfer cylinder mechanism comprises a cylinder 26 having one closed end 27 and insertable in the bore 25 where screw threads 28 on the cylinder engage in threads of the bore 25. A cylinder head 29 also engages the threads 28 of the cylinder and locks it in place. The cylinder 26 has reduced bores 30 and 31 near its fixed head. A compound differential piston 32 is sealed to the two bores by sealing rings 33, 34. An adjustable stop 35 is mounted in the head 29 and is adjustable therethrough, threads 36 being provided for this purpose. A lock nut 37 secures the stop in place where it limits travel of the piston 32. A coil spring 38 mounted under compression between the head 29 and piston 32 acts to return the piston toward the fixed cylinder head. A low pressure supply duct 39 is formed through the wall of the cylinder 24 and the surrounding wall of the member 11 to communicate with the small bore 31 at the closed fixed head. A high pressure duct 40 is formed through the wall of cylinder 26 and the wall of member 11 at the large diameter bore 30 and beyond the limit of movement of piston 32. A duct 41 also connects the large diameter cylinder with cylinders 12 beyond the limit of such piston movement.

Supply of pressure fluid to the ducts 39 and 40 is accomplished by application of pressure fluid from the pilot controlled valve controlling a pressure supply, not shown, through a line 42 and then through a pressure control valve 43 mounted adjacent the member 11.

The pressure control valve comprises a housing 44 formed with a bore 45. The bore is lined by an end disc 46, a series of collars 47, 48, 49 and 50 and a threaded plug 51. The collars 47, 48 and 49 are sealed to the bore 45 by sealing rings 52, 53 and 54 respectively sealed in grooves in their outer peripheries. Their inner bores are of the same diameter. The collar 50 is threaded to engage a threaded counterbore of the housing. It holds collars 47, 48, and 49 in place. A number of spacers 55 are mounted between collars 48 and 49 and provide a passage therebetween which connects to an annular space 56 connecting with a duct 57. Duct 57 connects with duct 39 of the transfer cylinder through a ring-sealed nipple 58. A plurality of spacers 59 are provided at intervals between collars 47 and 48 to provide an annular space therebetween which communicate through an annular groove 60 in the collar 48 and by way of ducts 61 and 61A with duct 40 of the transfer cylinder 26.

A plunger 62 is slidably mounted in the bore of collars 47, 48, 49 and is sealed to each collar by sealing rings. The plunger has a stem 63 about which a compression coil spring 64 is mounted. The spring 64 is located between the plunger 62 and plug 51 and holds the plunger normally against disc 46. Plunger 62 has an axial bore 65 extending from the end of the plunger to a cross passage 66 which in said normal position of the plunger communicates with the space 56 and by way of ducts 57 and 39 to the space between piston 32 and the fixed head of cylinder 26.

Formed in the housing 44 at the end of bore 45 is a cylindrical pocket 67 of smaller diameter. The disc 46 covers the pocket but has a central opening 65A providing communication with the bore 65 and several openings 68 therethrough about the opening 67. A supply passage 69 connects the pocket 67 with the pressure supply line 42 through a manifold 70. A cup 71 of rubber-like material is mounted in the pocket and the arrangement is such that pressure from passage 69 may deflect the cup and permit fluid to flow from passage 69 through openings 68 and 67. A coil spring 72 between the disc 46 and the cup holds the cup in place.

With low pressure in the manifold 70, spring 64 holds the plunger in the position shown in Fig. 3 and such fluid may flow from manifold 70 through passage 69, past cup 71 and by way of bore 65 and passages 66, 56, 57, sealing nipple 58, and duct 39 to the space between the small end of piston 32 and the fixed head of cylinder 26. The passage 60, and consequently the space at the large end of the transfer cylinder 26, is shut off under such conditions by the plunger 62.

Should clearance exist between the brake shoes and the brake disc, when such low pressure is applied, the piston 32 of the transfer cylinder would be moved away from the fixed head of cylinder 26. This would force liquid in the large end of the transfer cylinder through duct 41 to the bores 12 where the liquid forces the brake linings against the brake disc under light pressure.

After clearance has been taken up, movement of piston 32 ceases and pressure at manifold 70 builds up to a higher pressure, whereupon, plunger 62 is moved against the resistance of spring 64 to a position where its stem 63 contacts plug 51, air in the spring cavity escaping through vents 73. In that position, duct 57 is shut off by the plunger 62 and duct 60 is opened to passage of fluid thereto from manifold 70 by exposure of the space between collars 47 and 48 to the space within the bore of collar 47 permitting free flow from manifold 70 through duct 40 to the large end of the transfer cylinder where it places pressure upon the liquid therein and by way of duct 41 to cylinder bores 12.

Since duct 39 is shut off by such forward movement of plunger 62, no liquid can escape from between piston 32 and the fixed head of the cylinder 26.

Due to the difference in diameter of the ends of piston 32, a small amount of liquid introduced between the small end of the piston and the fixed cylinder head will displace a larger amount of liquid from the large end of cylinder 26 so that clearance take up is accomplished with a minimum displacement fluid.

Total displacement of the piston 32 may be limited by adjustment of stop 35.

To provide for slow return of operating liquid from cylinders 12 and the larger end of transfer cylinder 26, a by-pass duct 74 is provided which connects between duct 61 and manifold 70 by way of a needle valve 75.

In the operation of the invention, fluid under pressure from a pressure source controlled by the pilot is admitted to manifold 70. The plunger 62 is in the normal position shown in Fig. 3, and the fluid flows through the valve 43 to duct 39 and advances piston 32. This displaces a larger amount of liquid from the large end of the transfer cylinder to cylinder bores 12 taking up brake clearance. As pressure increased in manifold 70, plunger 62 is moved to its second position closing off duct 57 and sealing the liquid between the smaller end of piston 32 and the fixed head of the cylinder 26. At the same time, fluid under higher pressure is admitted to duct 61 by the uncovering of that duct by the plunger, and is applied through duct 61 to the larger end of the transfer cylinder and the cylinder bores 12.

Upon release of pressure by the master cylinder, plunger 62 is forced back by spring 64 closing off duct 60 and opening duct 56 to the bore 65. The cup 71 will not permit direct return of liquid from between cylinder head 27 and the small end of piston 32 through ducts 39, 57 and 56, and bore 54, and any liquid trapped in the small end of cylinder 26 remains therein. However, duct 74 and by-pass valve 75 permit regulated slow release of pressure from cylinder 12 by way of ducts 41, the large end of cylinder 26, and ducts 40, 61a, and 61, escape otherwise from duct 61 being blocked by plunger 62.

The operating liquid is substantially incompressible and any liquid trapped between the piston 32 and the cylinder 26 prevents relative movement of these parts by compression of the liquid irrespective of the pressure at which the liquid was forced between these parts. As the cylinder bore 31 is smaller than the bore 30, a small amount of liquid will displace a greater amount at the large end of the piston and therefore take up of brake clearance is accomplished with a minimum displacement of operating liquid.

While a certain representative embodiment and details have been shown for the purpose of illustrating the invention, it will be apparent to those skilled in the art that various changes and modifications may be made therein without departing from the spirit or scope of the invention.

I claim:

1. A brake having an operating cylinder and a piston therein for applying pressure to a brake shoe, a transfer cylinder having a bore progressively stepped diameter, a differential piston engaging large and small diameters of said transfer cylinder, means for supplying liquid under low pressure to the small end of said transfer cylinder to take up brake clearance, said supply means comprising a supply line, a spring loaded valve and a check valve in series therewith between said supply line and the small diameter end of said transfer cylinder, said spring loaded valve at low pressure closing off the large diameter end of said transfer cylinder from said supply line, said spring loaded valve being displaceable under increased pressure in said supply line to cut off the small end of said transfer cylinder from said supply line and to simultaneously open the large end of said transfer cylinder thereto, and an adjustable by-pass bleeder valve shunted about said spring loaded and check valves and connecting the large end of said transfer cylinder to said supply line to permit slow return of liquid to said supply line from the brake operating cylinder.

2. A brake as defined by claim 1 in which said transfer cylinder includes an adjustable stop for limiting movement of said piston and thereby limiting brake clearance.

3. A brake as defined by claim 1 in which said by-pass bleeder valve is an adjustable needle valve.

References Cited in the file of this patent

UNITED STATES PATENTS

| | | |
|---|---|---|
| 1,786,633 | Rushmore | Dec. 30, 1930 |
| 2,031,360 | Boughton | Feb. 18, 1936 |
| 2,361,878 | Schnell | Oct. 31, 1944 |
| 2,746,575 | Kinchin | May 22, 1956 |